United States Patent [19]
Kanigowski

[11] Patent Number: 5,340,059
[45] Date of Patent: Aug. 23, 1994

[54] ENERGY ABSORBING CABINET FOR AIRCRAFT BULKHEADS

[75] Inventor: Andrew S. Kanigowski, La Crescenta, Calif.

[73] Assignee: Futureflite Corporation, Carson City, Nev.

[21] Appl. No.: 28,732

[22] Filed: Mar. 8, 1993

Related U.S. Application Data

[63] Continuation of Ser. No. 840,469, Feb. 24, 1992, abandoned.

[51] Int. Cl.5 .................................................. B64C 1/10
[52] U.S. Cl. ................................. 244/121; 244/118.5; 297/488; 280/752
[58] Field of Search .................. 244/118.5, 118.6, 121, 244/122 R, 122 AG; 297/393, 396, 488; 280/751, 752; 105/344

[56] References Cited

U.S. PATENT DOCUMENTS

| | | | |
|---|---|---|---|
| 1,329,489 | 2/1920 | Williams, Jr. | 244/121 |
| 2,626,163 | 1/1953 | Scantlebury | 244/121 X |
| 2,859,048 | 11/1958 | Munn | 297/488 X |
| 3,525,535 | 8/1970 | Kabori | 297/395 |
| 3,603,535 | 9/1971 | DePolo | 244/121 |
| 3,831,705 | 8/1974 | Glance | 280/752 |
| 4,552,381 | 11/1985 | Schlanger | 280/752 |
| 5,085,382 | 2/1992 | Finkenbeiner | 244/121 |

FOREIGN PATENT DOCUMENTS

| | | | |
|---|---|---|---|
| 0228386 | 3/1960 | Australia | 297/488 |
| 2236997 | 11/1971 | Fed. Rep. of Germany | 280/752 |

Primary Examiner—Margaret A. Focarino
Assistant Examiner—Christopher P. Ellis

[57] ABSTRACT

An energy absorbing cabinet assembly (24) attached to a rear wall of the aircraft cabin bulkhead (10) and positioned directly in front of the airline passengers sitting in front-row seats. The cabinet assembly is achieved from a combination of a storage box unit with an airline-type foldable food table and is formed to a convex shape toward the face and chest of passengers sitting immediately behind. Both the cabinet support structure and the food table structure are made from energy absorbing materials and are capable of yielding and deforming under an impact from behind (with the table tray helping to spread the impact load and to dissipate the kinetic energy over a large area). Such a combination of two basic elements; a storage box and a food tray, provides not only two basic functions of storage space and eating place for passengers but also provides the additional and primary benefit of protecting the heads of front-row seat passengers during crash landing emergencies.

6 Claims, 5 Drawing Sheets

ENERGY ABSORBING CABINET FOR AIRCRAFT BULKHEADS

REFERENCE TO RELATED APPLICATIONS

This is a continuation application of my patent application Ser. No. 07/840,469 filed on Feb. 24, 1992.

BACKGROUND—TECHNICAL FIELD

This patent application covers a new and original design of an article of manufacture. This invention relates to the storage cabinet installed on the rear wall of the aircraft bulkhead, galley, lavatory or any other partition in the aircraft cabin. More particularly, this invention introduces several unusual functions of the ordinary storage cabinet. Its primary function is to provide suitable crash landing protection for the airline passengers occupying front-row seats. The cabinet shall work as the energy absorbing device to minimize damage to the heads of the passengers in case of forced landing conditions. One of the secondary functions is a storage space capability of the cabinet during daily and routine airline operations.

BACKGROUND ART

Airline passengers are generally seated in the forward facing fashion. All are arranged in rows of seats installed one behind the other throughout the length of the aircraft cabin. Most of the passengers face a seat back structure positioned immediately in front. It is only for the front-row seat passengers that there is usually only a flat vertical wall in front of the seat occupants. This wall is customarily a rear wall of the cabin bulkhead, galley, lavatory or partition (hereinafter called bulkhead). The large screen for projecting in-flight movies is sometimes located on this flat vertical wall.

The front-row seat position is often desirable for many air travelers because it provides relatively more leg room. However, this front-row position is also very vulnerable and is presently one of the most dangerous places to be situated in the case of a survivable crash landing (survivable for passengers not in front-row seats). There are two reasons for this hazardous situation. One safety hazard is due to the typical restraint system utilized in the aircraft cabins. All of the airline passengers wear traditional lap belts only and without any upper torso restraint (without shoulder harness). Secondly, the major hazard is due to the bulkhead itself, if it is a solid wall located at certain distance. In the event of a high-g crash landing, the upper torso and head of the seat occupant is not restrained and is free to accelerate forward and to strike violently on the hard bulkhead wall in front.

Figure 1:
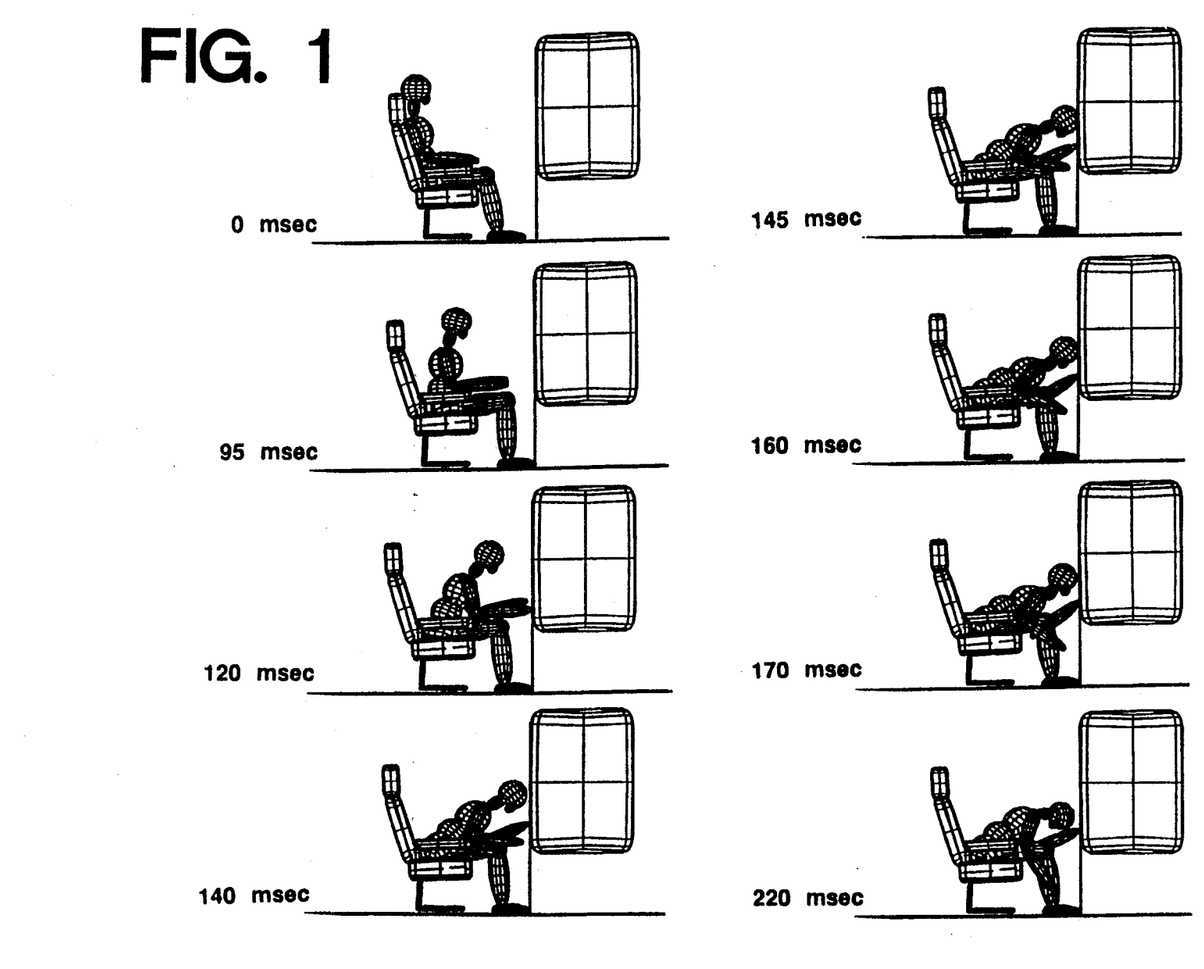
FIG. 1 shows the sequence of passenger head strike on cabin bulkhead when passenger is wearing traditional lap belts only. It is a plot of computer model simulating 16-g crash forces; bulkhead is located 35 inches in front of the Seat Reference Point (SRP), 50 percentile dummy, strong head impact, deadly HIC levels and possibly broken neck. Drawing provided by FUTUREFLITE Corporation conducting advanced research on HIC related issues.
Figure 2:
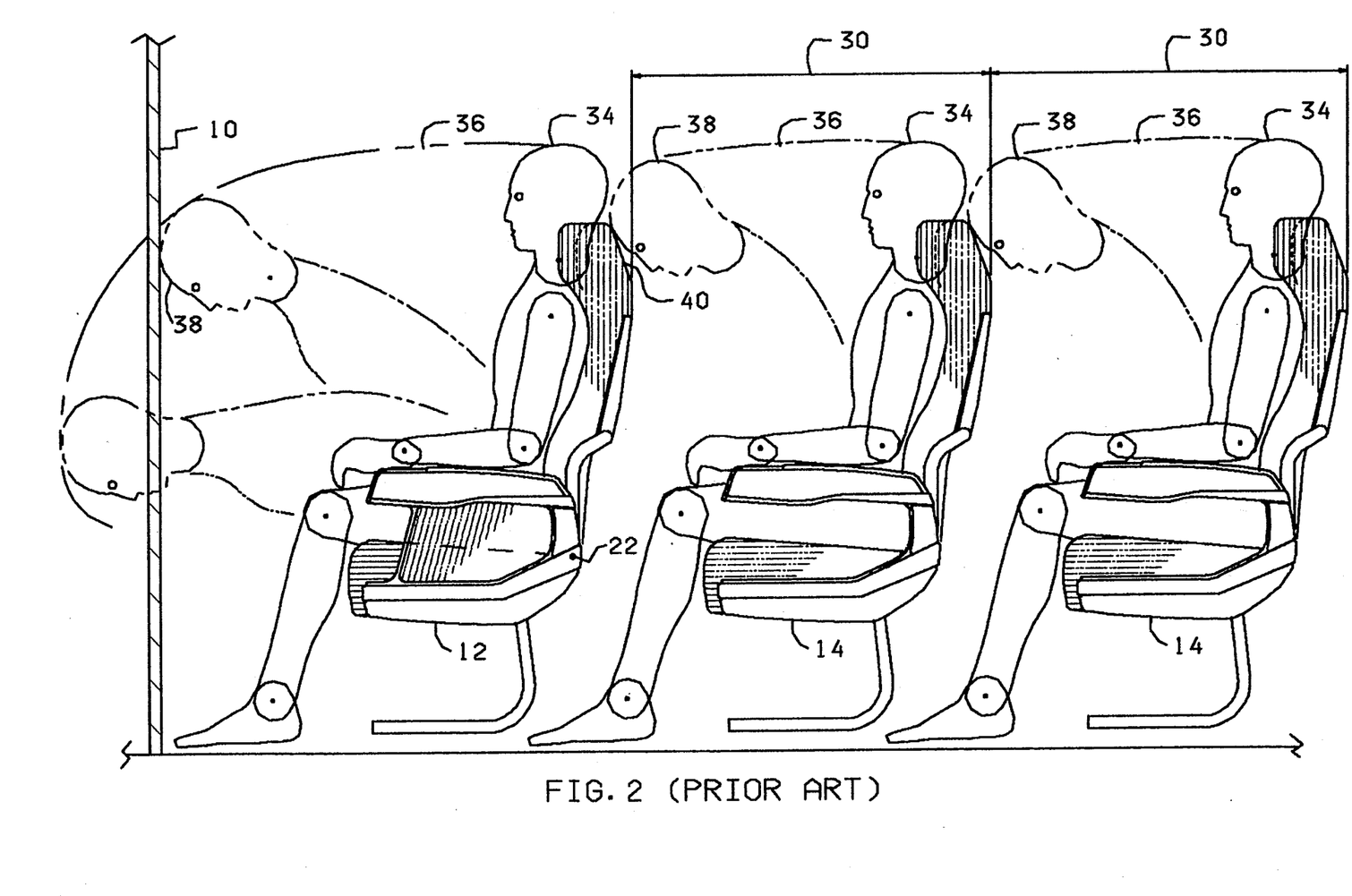
FIG. 2 shows the side view of the airline aircraft cabin with passengers sitting one behind another and after the flat vertical bulkhead wall (prior art). It also shows the head strike envelope of passengers during crash landing with a strong impact on bulkhead.

This impact on the hard wall can result in needless death or very serious bodily injury due to damage to the brain or from damage to the pivotal point of head or the upper spinal cord. Please refer to FIGS. 1 and 2 for better visual explanation.

In such a case, confronting the bulkhead, the front-row seat occupant has generally two basic chances for survival. For simplicity, all other factors are neglected here and the two following chances are limited to the dimensional proximity of the passenger's head to the bulkhead wall in front:

1). The bulkhead is far enough to clear the head strike envelope so there is no head/bulkhead contact at all, or, the impact would occur but with a very low velocity (near the far/forward end of the head travel envelope (near where head travel stops). Low velocity means low kinetic energy of impact.

2). The bulkhead is close enough, the closer to face the better, so the impact does occur at once but at a very low initial velocity. The impact would take place at the beginning of the head travel trajectory thus preventing head acceleration. In other words—intentional "early" crash with a low relative speed.

As one can see, the safest regions are at both extremities of the head travel envelope where the relative "speeds" of head are low. Accordingly, the most dangerous and critical range of travel is in the middle/forward range where the head accelerates the most.

Unfortunately, at present, there are many airline aircraft flying worldwide with the bulkheads located near the most critical positions. Standard dimension, industry-wide, is a minimum of 35 inches measured from the Seat Reference Point (SRP) to the face of the solid bulkhead without protuberances. This 35-inch location may result in a very high energy of head impact during otherwise survivable accident.

What is even worse, present airline safety brochures seem to suggest very bad "defensive" position for the front-row seat passengers during an emergency landing. Position pictured in these brochures is showing a passenger bracing his legs and with the head positioned low, between the knees. This position seems to assure a strong head-first impact on a 35-inch bulkhead. It also exposes the spine to absorb all of the compressive forces of the impact. By comparison, this situation can be best visualized trying to imagine a person jumping head-first into a shallow swimming pool. Now please imagine this person still jumping head-first but without arms stretched forward, just bracing the legs instead. . . .

The dynamic tests to simulate 16-g crash landing forces performed by the FAA in the past few years confirm that this 35-inch proximity to bulkhead can cause fatal head injuries during otherwise survivable crashes (survivable for passengers not in front-row seats).

The level of survivability related to the head impact can be measured and predicted mathematically. The method was scientifically developed and is well documented in specialized literature. It is known in this industry as the Head Injury Criterion (HIC) level. The maximum acceptable level of HIC was arbitrarily set at 1000 units and is measured during qualification testing of new airline seats. Such qualification testing involves a dynamic simulation of a 16-g crash impact with use of test dummies. Dummy head accelerations are measured during testing and are inserted to the mathematical formula to arrive at the HIC value. In turn, this determines a qualification pass or fail criteria (with failure declared when HIC is over 1000 units).

In more simple terms, in both the mathematical formula and in the real life scenario, survivability is directly related to the velocity/magnitude of the head impact. Essentially, it is well known that the stronger the head impact, the higher the chances for fatal brain damage or for otherwise fatal head injuries. In either case, death occurs within a fraction of a second resulting from internal impact of the human brain against the inside surface of the skull or vice versa. In any case, the key to critically important brain survival is in adequate dissipation of kinetic energy of impact to neutralize otherwise deadly forces and accelerations.

Without going into more detail on the above, the airline industry is currently experimenting with four basic methods in attempt to solve described HIC problem with bulkheads:

Method 1: Installation of a shoulder harness in addition to the traditional lap belts only in the front-row seats.

Method 2: Automotive type air bags installed on the bulkhead wall and in front of the first row of passengers.

Method 3: Mechanical units incorporated in the seat structure to provide a seat rotation (articulation) during a crash impact.

Method 4: The simplest (so far) and indisputable method is a requirement to remove the entire row of front-row seats or to make substantial cutouts in the bulkhead (galley).

Unfortunately, none of the above is readily acceptable for the flying public or for the airline industry because of the following reasons:

Method #4, removal of seats, means a reduction of the revenue capacity which is generally not acceptable for the airline operators/management. The same also applies to reduction in the galley storage volume.

Method #3, seat rotation (articulation) means a complicated seat construction and is not yet proven. It is also a bit strange approach to accomplish a motion against the direction of inertia.

Method #2, air-bags, is more realistic but it may be prone to the accidental (and very noisy) deployment during in-flight gust loads, occasional hard landings or it may reduce a post-crash evacuation passage by unwanted path encroachment. Furthermore, automotive type bag triggering mechanism does not work as expected in jet airplane applications because of some fundamental differences in the crash profiles.

Method #1, introduction of the shoulder harness on the front-row seats, seems to be the most proven method in the seating business but airlines are reluctant for the valid reason: Passengers would too often question their flight attendants as to why there are two different restraint systems available. It may look like uneven chances for the majority of the flying public.

The efforts to solve the aforementioned problems are very serious at this time and without any real breakthrough to date. Effective date for the mandatory implementation of additional bulkhead protection is approaching rapidly but without any workable solution to satisfy all of the parties involved. For this reason, some of the industry delegates have recently petitioned the FAA for exemptions and waivers from the new HIC regulations. In addition, many existing airliners would be permitted to continue flying with the known deficiency of incorrect 35-inch bulkhead spacing if their cabin layout was approved and certified earlier.

Consequently, the major problem is that the industry has failed so far to correct the known passenger safety problem of the bulkhead in front of the first row of airline seats. However, there seems to be no problem with HIC values for the middle rows of seats, where passengers impact the seat backs of the seats immediately in front.

SUMMARY—DISCLOSURE OF INVENTION

The new design and fully proven solution to described problem is based on a very simple and logical principle.

Here is the full disclosure of the innovation that shall be adequate for anyone ordinarily skilled in this field to fully understand it, make it, and use it throughout the aircraft and/or the seat or galley building industry.

THE PRINCIPLE: IF THE SEAT BACK STRUCTURE LOCATED IMMEDIATELY IN FRONT OF THE MIDDLE ROW PASSENGER PROVIDES ADEQUATE PROTECTION FOR THE HUMAN HEAD IN CASE OF THE CRASH LANDING, THEN THE IDENTICAL SEAT BACK STRUCTURE, MOUNTED THE SAME WAY ON THE BULKHEAD WALL SHALL PROVIDE AN IDENTICAL PROTECTION LEVEL FOR EACH PASSENGER SITTING IN FRONT-ROW SEATS.

The reader is encouraged to read above one more time to fully understand the logic of this axiomatic principle. It is essential to understand that the closest possible duplication of the environment of the middle rows will deliver the same results and benefits for the front-row seat occupants.

Of course it would look somewhat awkward to mount three seat back supports on the wall in front of a standard triple seat in the airline cabin. Following in next sections is a full description of the preferred embodiment of this invention in a pleasing and very practical envelope.

BRIEF DESCRIPTION OF DRAWINGS

Please refer to submitted drawing Figures.

REFERENCE NUMERALS IN DRAWINGS

10 - bulkhead or galley rear wall
12 - passenger seat in a front row position
14 - standard seat (not a front-row type)
16 - seat back support structure
18 - seat back mounted foldable food table
20 - attachment hardware for back support and table legs
22 - Seat Reference Point (SRP)
24 - FUTUREFLITE Cabinet
26 - legs, food table
28 - latch, food table
30 - seat pitch spacing
32 - pillows and blankets stored in cabinet (optional)
34 - passenger, the seat occupant
36 - head travel envelope before impact
38 - head position at or after impact
40 - padding in the head strike area
42 - structure frame of cabinet/structure support shell
44 - cabinet storage volume cavity
46 - video screen or telephone units
48 - side wall of cabinet
50 - literature pocket
52 - filler flush with table aft surface

BEST MODE, DETAILED DESCRIPTION OF INVENTION

Figure 3:
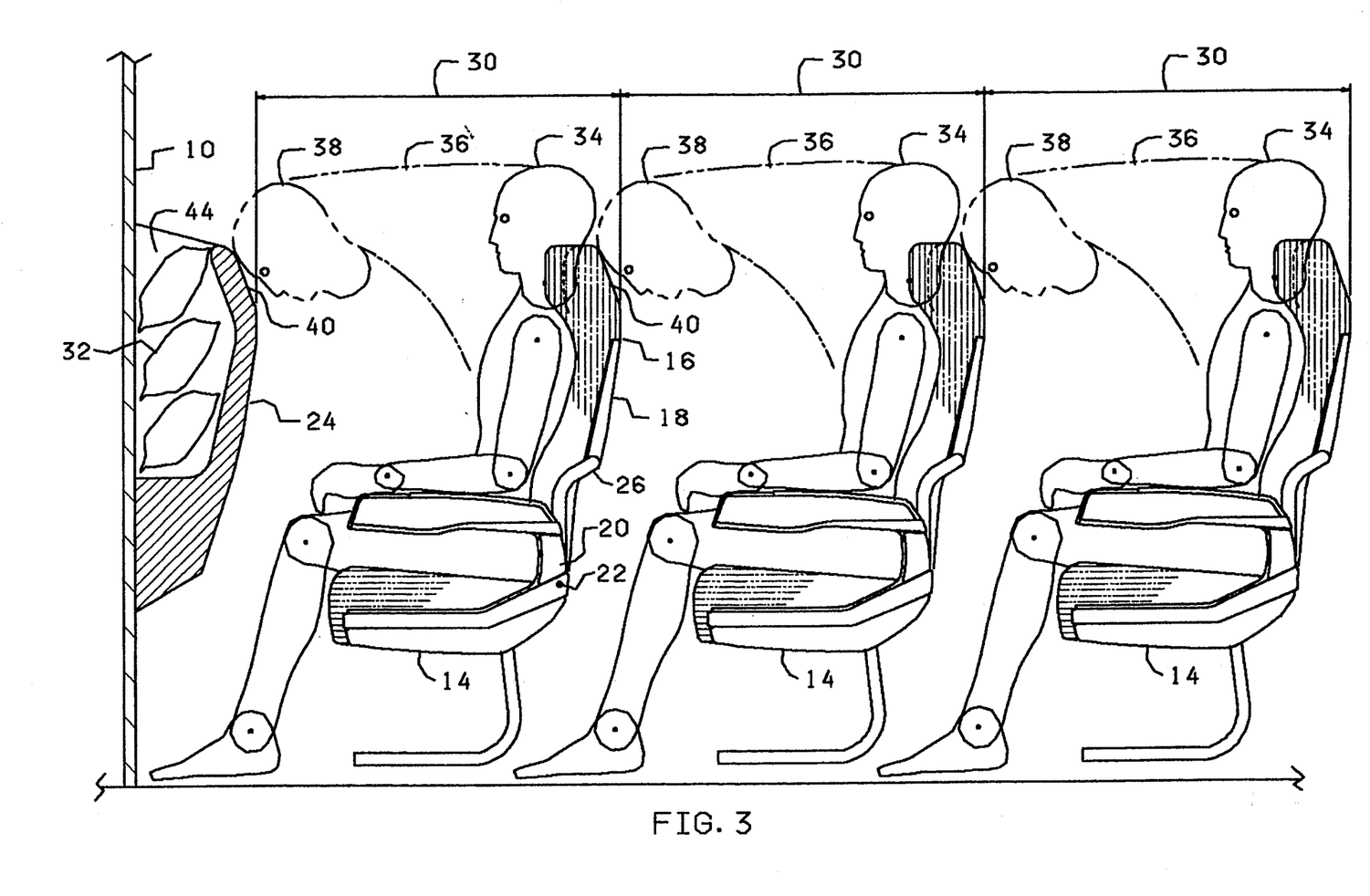
FIG. 3 shows the side view of the airline aircraft cabin with front row passengers facing the FUTUREFLITE Cabinet attached to the existing bulkhead (new principle explanation). This Figure also shows the identical living space, identical seats and the same head strike radius for all passengers sitting at the same seat pitch spacing. Equal chances for survival for all passengers in the same class of cabin service.
Figure 4:
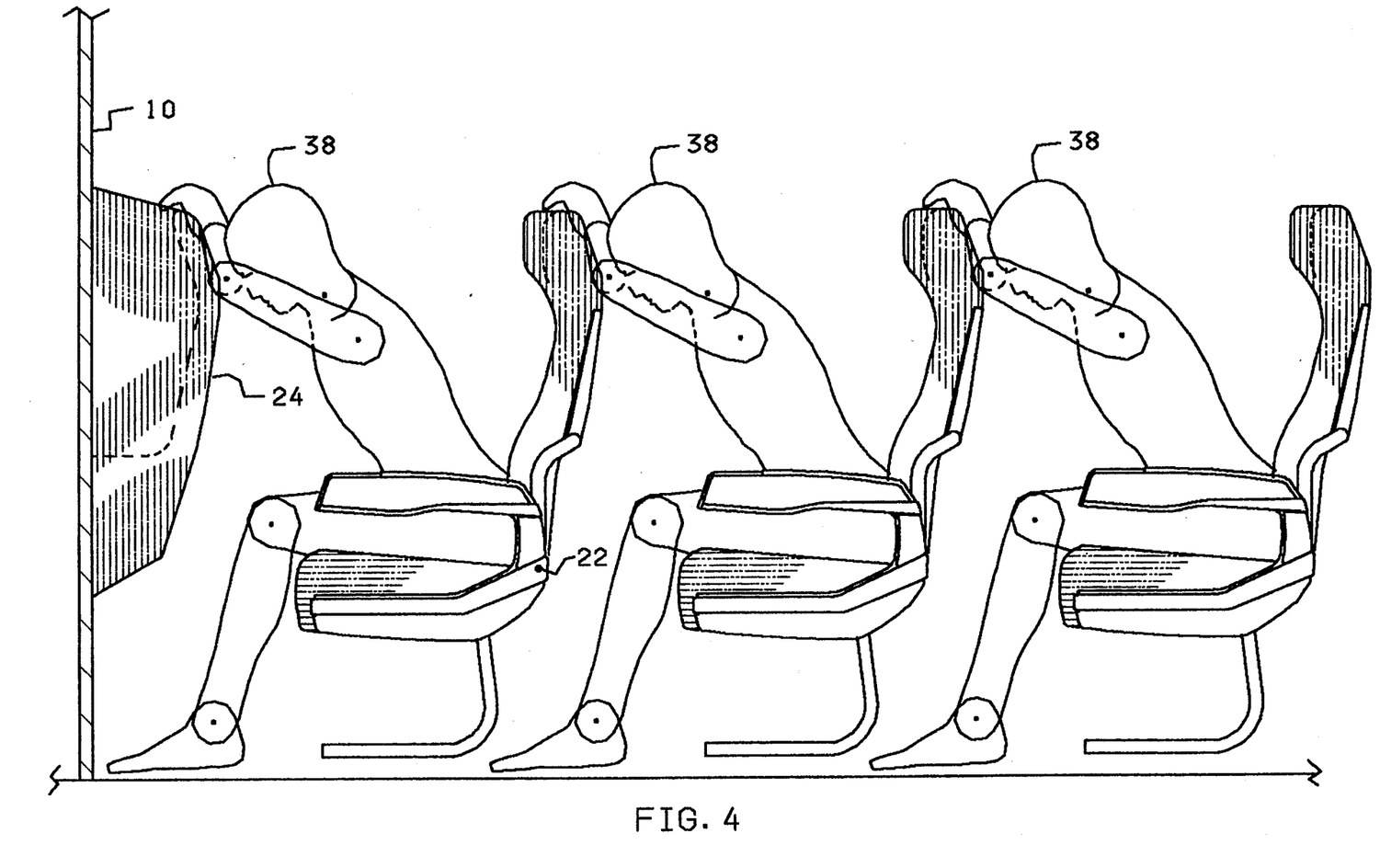
FIG. 4 shows the side view of recommended defensive position of passengers during an emergency landing. All passengers, including those in the front-row seats shall have identical chances for survival (which is contradictory to the current art shown in the airline safety brochures). In the defensive position as shown here there is no head acceleration toward obstacles, no head impact, the eyes are protected behind forearm and passenger neck is not being compressed.

The FUTUREFLITE Cabinet 24 is a simple stationary storage box to act as a large bumper when attached to any bulkhead 10 in front of the airline passengers 34 as shown in FIG. 3. It is a simple energy absorbing structure assembly comprising few parts only.

It is essential to build it, shape it, use the same ductile materials, and otherwise duplicate it as close as possible to existing seat back support structures which have known and proven characteristics of sufficient energy absorbing during a 16-g crash. For example, one may try to utilize a traditional inverted U-shaped backrest frame made from ductile aluminum tubing, capable of deforming under load and proven during actual 16-g dynamic test simulations. Dimensional location of the cabinet impact surface near the top edge is extremely important. Researchers are encouraged to create a graphical curve to show an actual HIC value in the function of head clearance at one inch pitch intervals; analytical and/or derived from actual dynamic testing with dummy.

The cabinet shall be furnished with suitable padding 40 near upper edge area and it may be improved to provide a better protection for the head than a standard seat back structure. However, caution is needed to avoid a situation that the improvement would deliver results contrary to anticipated. For example, a "logical" breakover capability of the previous seat back structure was found to deliver actual HIC values worse than a regular back support without any breakover. This is partially because existing breakover devices do not absorb much energy.

In lieu of actual test data, a theoretical rule of thumb is hereby proposed that the closer the box is to the face of passenger, the better the protection for the head and upper torso. Reason: the box would essentially work as an actual restraint device if pressed tight against the passenger's face and chest (similar to the air bag effect). This assumption may be taken a dramatic one step further in attempt to solve other industry problems with HUD spacing, glareshield and window impacts, femur loads, armrest padding, etc. Commercial aircraft industry currently requires to completely clear such cabin/cockpit obstacles from the area of reach by the seated person or during a 16-g crash. It is hereby recommended that instead of trying to clear such cabin/cockpit obstacles one may try to actually get the obstacles very close to the human body to induce a sort of early "crash" with low energy of impact. Such intentional physical obstacles, deliberately located in very close proximity and immediately in front of the human body would deliver very low HIC values during a 16-g impact. This can result in improved crash landing protection for crews and passengers and this theory is completely different from current requirements and practices of the commercial aircraft industry.

Other essentials: structure frame 42 of the cabinet shall be made from any material with good energy absorbing capabilities and shall yield and bend, not break during the impact. Structure shall be smooth under padding 40 in the head strike area. Entire aft surface of the box shall be considered a strike area. No protrusions of any kind, no sharp projections or corners. Everything well rounded off and suitably padded. Delethalization made from too soft materials may feel good to touch but it will not work in a violent impact. It will bottom rapidly, absorbing very little energy.

The cavity volume 44 of the empty box may be used for storage of the pillows and blankets 32 during takeoffs and landings. This is to provide additional padding during an emergency and to relieve other valuable storage space on board.

The cabinet shall include a regular back-mounted food tables 18, also made from good energy absorbing materials. A foldable food tray installed similarly like on the tourist class seat back is beneficial in many ways (some described later) and is primarily intended to spread the impact loads over large area for better absorption of kinetic energy. Such foldable table system may have typical legs 26 and table latch 28.

Upper area of cabinet may have video screens or telephones 46, both installed like on any other standard seat 14. The literature pockets 50 are recommended in the lower area.

Such arranged cabinet with equipment as described above is also intended to eliminate the need for traditional and rather expensive front-row type seats with food tables and videos installed in special front-row armrests.

To enhance appearance, side walls 48 of the box shall be aesthetically shaped to hide the looks of the half-a-seat. The aft (exposed) surface of the box shall resemble a wide cabinet rather than a rear view of the seat. Horizontal styling lines are recommended as shown on FIG. 6. The filler 52 is also recommended to close gaps between the tables 18. This is to create clean and flush surfaces and to further enhance the smoothness of the strike areas as the filler would neutralize side edges of tables 18 and legs 26.

SUMMARY, RAMIFICATIONS AND SCOPE

It is the object of this invention to provide a very reliable safety device, affordable enough for wide use in the airline service. It is intended to correct serious safety hazards associated with present bulkheads at 35 inches.

The FUTUREFLITE Cabinet is easy to build, install and operate on all bulkhead-type walls in airline cabins. It does not require any maintenance, operational instructions or training. The simplicity of design lends itself to relatively inexpensive fabrication and installation in any new aircraft and for all retrofit applications. As shown in the previous sections of this patent application, the new cabinet/bumper will primarily benefit all front-row seat passengers by providing a safer environment during crash landing, neutralization of the head strike impact and likely salvage of passenger's brain and neck.

As one of the secondary functions, the cabinet will provide valuable storage space capacity which is never in big supply in the airline aircraft cabins.

The unobviousness of this new design is best visible in the actual airline cabins. Nothing similar to this cabinet is available or visible on the bulkheads in the current airliners. The industry is spending a lot of money and effort to solve the HIC problem associated with the 35-inch bulkhead location. However, the proposed solutions are not satisfactory. The main reason for the failures can be attributed to initial attempts to utilize automotive-type crash protection devices. Although it may seem like the natural choice, these units do not work as expected in airplane applications because there are some fundamental differences between automobile and jet airplane crash profiles (speed, energy, impact force, deceleration time, etc.). Generally, automotive-type devices are inadequate for this specific application and as such shall not be considered as obvious candidates.

The aircraft makers, seat vendors, and the airlines are really worried at the time of this writing as the time is running out. The exemption and waiver requests have been filed with the FAA as the airplane manufacturing industry was unable to solve the HIC problems in allocated time frame for compliance with new rules.

Fortunately, present invention solves above safety problems on a basis of a very simple (but unforeseen so far) principle to duplicate the environment of the proven middle seat rows to achieve the same results for the troubled front-row seat positions.

New and unexpected results which flow from this design were not shown or suggested in previous airline seating arrangements. Based on long-term professional experience in the design of aircraft seating, it is believed that this invention will provide a workable, low-cost solution that is significantly different from anything heretofore designed to solve 35-inch bulkhead head strike problems.

At the same time, this invention provides a surprising solution to numerous other design problems associated with the front-row type seats such as food table, telephone or video installation. A complicated and expensive front-row type seat is no longer needed as FUTUREFLITE Cabinet simply eliminates it entirely along with the elimination of all above problems. But perhaps even more important is the elimination of the need for a really complicated, unreliable and very expensive industry proposition to solve HIC problems with special front-row seats which rotate-up on impact.

All of the above extra benefits are free, unanticipated and unforeseen on top of the otherwise plain (but valuable) addition of storage space suggested by the ordinary storage cabinet. In short, the fact of added benefits and extensive cost trade-off shall not be overlooked by the airlines as the new cabinet may well pay for itself.

Furthermore, this invention brings additional and totally unexpected benefits, hardly measurable in monetary terms:

It permits identical living space, identical seats and identical chances for survival for all passengers on board paying the same fare for the sitting place in the same class of airline cabin service. In other words, it eliminates uneven advantages by providing an equal level of roominess and safety for all passengers in the same class. The usefulness potential of such distinction is well beyond the scope of this work.

In summary, this invention provides numerous synergistic results of otherwise ordinary combination of two basic elements; the storage cabinet (for storage space) and foldable table (for eating place). The sum of all synergistic results as described here is by far exceeding the sum of two elementary (and not the most important) benefits of the above combination.

The high degree of novelty is simply in the fact that current airline cabins do not have any box-type cabinets installed next to the faces of the front row passengers. In fact, so far, such installation is prohibited by current FAA regulations still in force at the time of this writing. The 35-inch minimum clearance rule is also widely adopted by all international aviation authorities and by foreign airplane makers. This new method of providing crash landing protection by creating an intentional physical obstacle is completely different and contrary to the principles of the current expert knowledge in this field.

Summing-up, although the description above and drawings submitted contain some specifics, these should not be construed as limiting the scope of this invention but as merely providing illustrations of some of the presently preferred embodiments. For example, the cavity volume of the cabinet presents several options for usage, other than described here. Alternatively, the box may not be utilized for storage and the entire body may be filled with foam to provide a thick safety bumper instead.

Another embodiment is in possible adjustment of the cabinet aft panel surface toward the face of the seat occupants before take-off or landing, or in a different shape, position or height other than shown on submitted drawings.

Figure 5:
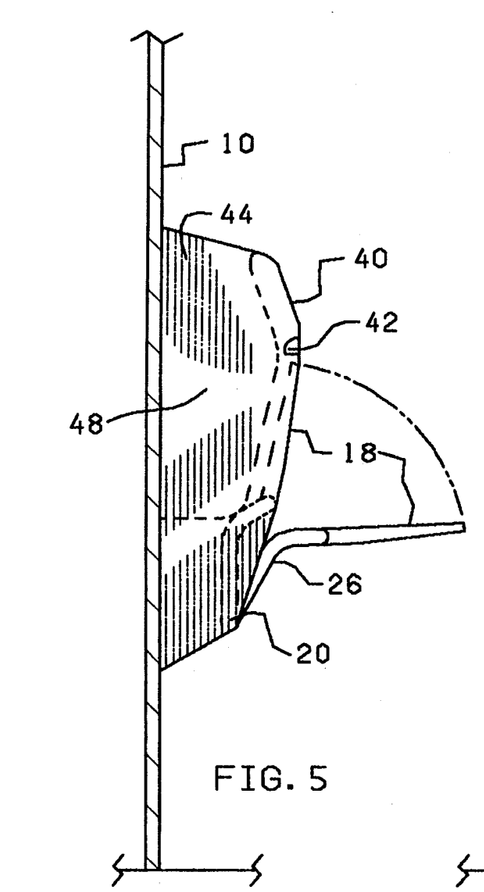
FIG. 5 shows the side view of the FUTUREFLITE Cabinet including foldable food tables (preferred embodiment).
Figure 6:
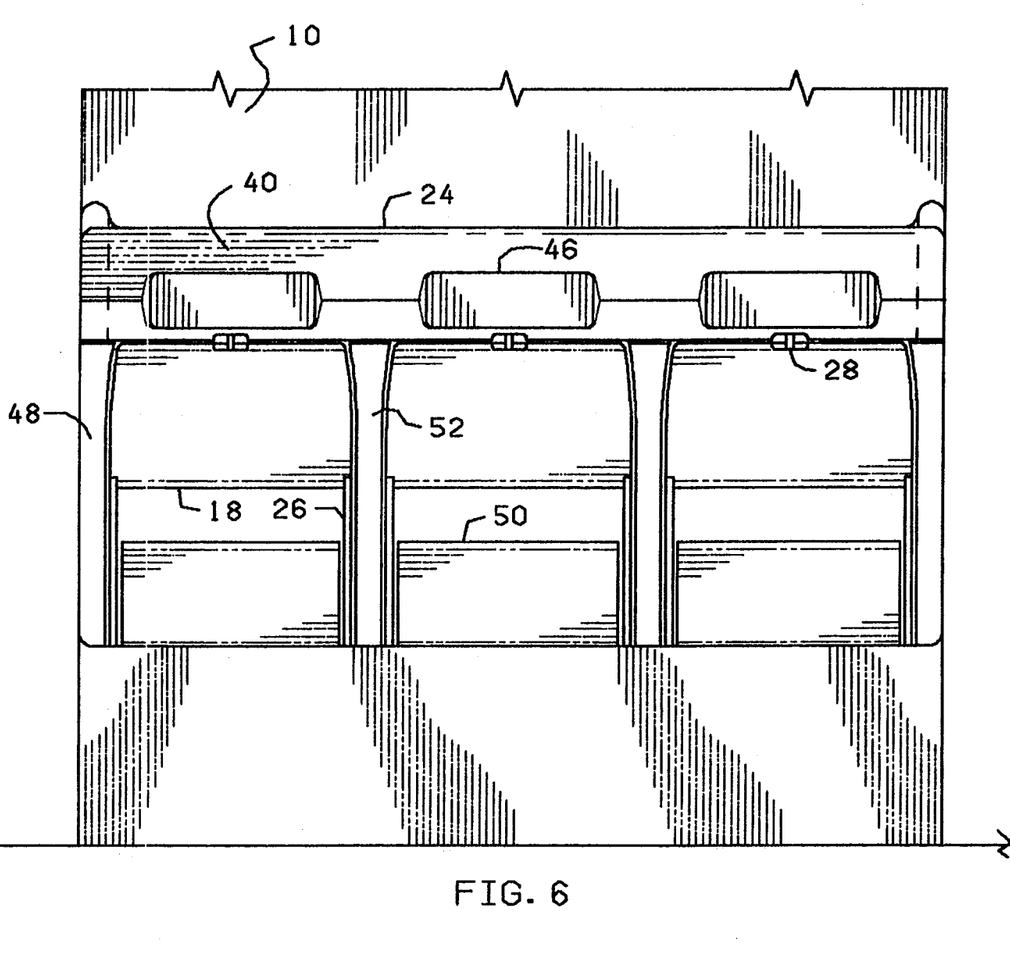
FIG. 6 shows the view looking forward at FUTUREFLITE Cabinet in a triple version (for location in front of the triple seat). Other possible multiple versions like doubles, quads or quints are not shown as being apparent.

Also, instead of attaching the cabinet to the bulkhead wall, the convex profile of similar contour could be built directly into the rear wall surfaces of the galley or lavatory. The FUTUREFLITE Cabinet as shown in FIG. 5 and 6 may be of different width and for any combination of the seats behind the bulkheads (not only the triple version as shown).

In yet another version, the FUTUREFLITE Cabinet may be equipped and specially tailored to meet the requirements of families traveling with small children. In this mode, the cabinet could have compartments for stowage of baby care items, complimentary toys provided by the airline, or even a safe space to place and restraint infants during take-offs or landings.

As mentioned earlier, the FUTUREFLITE Cabinet is also very well suitable for retrofit into any existing airline interior to correct a known safety hazard of the 35-inch bulkheads. It may be attached to most existing bulkheads without the necessity of any changes in the airplane floor plan layout, without relocation of seats or without expensive modification of galleys. It could be easily added and certified by the FAA when fully proven to enhance safety.

Thus the scope of this invention should be determined by the appended claims and their legal equivalents, rather than by the examples given.

I claim:

1. An energy absorbing cabinet assembly as a protection device for airline passengers sitting in front-row seats, achieved from a combination of a storage box unit with an airline-type food table, adapted for attachment to a rear wall of bulkheads of an aircraft cabin and positioned directly in front of said front-row seats to form a seat-back duplication, wherein said cabinet assembly comprises a plurality of sections arranged side-by-side, one such section provided for each passenger sitting immediately behind, and each said section comprising:

(a) a structure support shell assembly made from energy absorbing material, said structure support externally encapsulating an internal storage cavity volume, with a local access cutout, said structure support shell further including a main rear wall panel element facing the head and chest of said airline passenger sitting immediately behind said cabinet assembly;

(b) a deployable food table system including a board of sufficient size to support an airline meal tray;

wherein said energy absorbing structure support shell assembly and said deployable food table system have sufficient combined capability to yield and deform forwardly under an impact caused by a head strike from said passenger during a crash.

2. An energy absorbing cabinet assembly as recited in claim 1 further including a foam padding means externally positioned on said energy absorbing structure support shell to thereby aid in reduction of secondary injuries.

3. An energy absorbing cabinet assembly as set forth in claim 1 wherein said structure support shell assembly contains an inverted U-shaped frame member made from ductile tubing material, said inverted frame having an upper cross bar and two side arms with spaced apart lower ends so to resemble shape and ductile bending attributes of a seat back structure frame as used in airline passenger seats.

4. An energy absorbing cabinet assembly as recited in claim 1 further including a plurality of pockets provided for stowage.

5. An energy absorbing cabinet assembly as recited in claim 1 further including a plurality of telephones and video units positioned above said deployable food tables and provided for use by said passengers sitting in front-row seats located directly behind said bulkheads.

6. A passenger safety device according to claim 1 including an improved safety bumper system attached to said airline aircraft bulkhead rear wall surface, comprising a substantial mass of lumped body block made from energy absorbing material, including a thick slab of foam of sufficient firmness and size to dissipate kinetic energy resulting from a head strike from said passenger wherein the aft surface of said bumper is located at a horizontal distance measuring less than 35 inches from a front face of the seat back cushion of said front-row seats and said bumper further includes the capability to cave-in under a load generated by said head strike whereby such improvement provides a suitable simplified protection for said airline front row passengers located immediately behind said safety bumper.

* * * * *